Oct. 3, 1950     L. H. PLATT ET AL     2,524,328
CONVEYER BELT DRIVE
Filed May 23, 1946
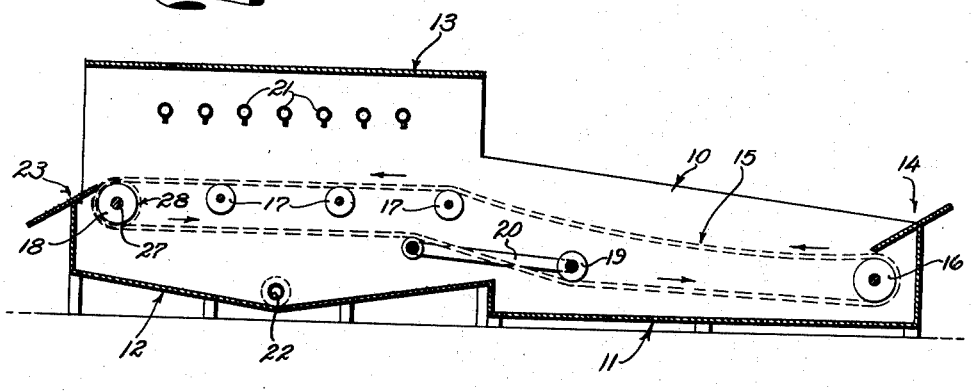
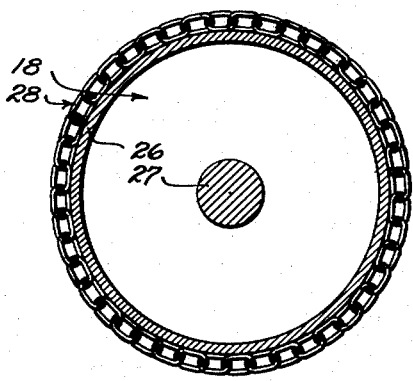
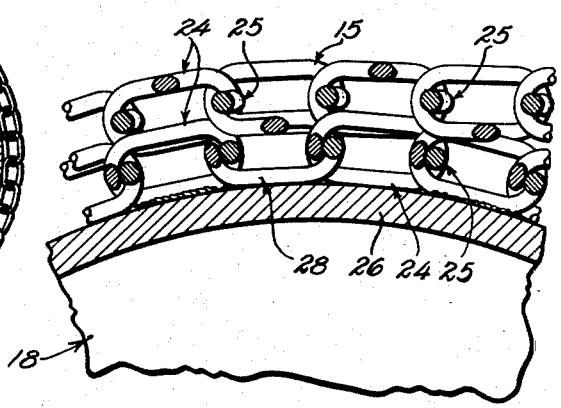
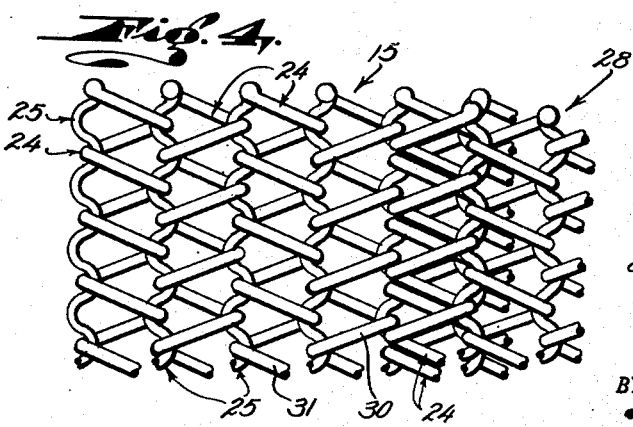
LELAND H. PLATT,
LELAND H. PLATT, JR.
and
JOHN D. PLATT
INVENTORS
ATTORNEY Patented Oct. 3, 1950

2,524,328

UNITED STATES PATENT OFFICE 2,524,328

CONVEYER BELT DRIVE

Leland H. Platt, Leland H. Platt, Jr., and John D. Platt, Los Angeles, Calif.

Application May 23, 1946, Serial No. 671,828

5 Claims. (Cl. 198—203)

This invention has to do with improvements in conveyor belt drives, particularly for woven wire belts as of the type used in produce washing machines and heretofore presenting problems of considerable difficulty in properly and smoothly driving belts of extensive length.

Various characteristics of the belts, including their physical (woven) formation, weight and responsiveness, or lack of responsiveness, to conventional drives, have in the past necessitated complications in the driving mechanisms, such as plural drive rolls, compensating expedients and other mechanical appurtenances, all of which have represented substantial and expensive parts of the equipment, and then without affording entire satisfaction.

In accordance with the invention, we have been able to obviate such difficulties in effecting drives for the present type of conveyor belt, by an improvement characterized by its extreme simplicity and yet ability to provide a positive and in all respects satisfactory drive for woven wire belts of all lengths within practicable limits.

Briefly, our objective is accomplished by providing an endless rotative drive engaging and presenting to the conveyor belt a driving surface also of woven wire formation, and preferably having the same weave as the belt. In this manner the belt becomes in effect "geared" to the drive both longitudinally and transversely, by reason of the interconnecting or interfitting relation of the driving and driven surfaces.

Specifically the invention contemplates the use of a drive roll, which alone may serve as the sole drive for an extended belt, to which is applied an endless band of woven wire, the strands or wire formations in which are so related to the belt weave that the drive band is capable of advancing the belt at a speed corresponding to the speed of the band rotation, while having such interfit with the belt as will prevent any lateral belt movement relative to the drive. As indicated, the most efficient interfitting relation between the belt and drive band, is attained by using the same form of woven wire for both.

The various features of the invention, as well as the details of a typical and preferred embodiment thereof, will be understood to better advantage from the following detailed description of the accompanying drawing, in which:

Fig. 1 is a diagrammatic view illustrating in longitudinal cross-section a typical embodiment of the invention;

Fig. 2 is an enlarged cross-sectional view of the conveyor belt drive roll;

Fig. 3 is an enlarged fragmentary section showing the interengagement of the conveyor belt with the woven wire band applied to the drive roll; and Fig. 4 is a plan view illustrating the interfitting relation of the belt and drive roll band.

The invention has proven highly satisfactory for the driving of conveyor belts in the general type of vegetable produce washer shown in Fig. 1. The washer structure is shown to comprise a housing 10 having bottom tank sections 11 and 12, and a hood structure 13 overlying the latter. Produce entering the machine at 14 is deposited on a conveyor belt 15 extending forwardly from rolls 16 over rolls 17 horizontally supporting the upper span of the belt during its travel within the hood section 13 of the housing to the drive roll 18. The under span of the belt then passes beneath roll 19 carried by the swinging take-up arm 20.

In being carried forward on the conveyor belt within the tank section 11, the produce is submerged in water standing at a level above the belt. As the produce is carried forward into the hood section 13, it is sprayed with water directed downwardly from pipes 21 to which water is continuously recirculated from the tank 12 through the bottom outlet 22. The washed produce is discharged from the spray section at 23. At this point it may be observed that because of the length of the machine or the distance between rolls 16 and 18, and the necessity for maintaining the belt travel at different elevations as explained, the problem of maintaining a drive capable of assuming the belt pull load and of advancing the belt steadily at a uniform rate, has presented considerable difficulties. In accordance with the invention, the problem has been solved in a manner requiring application of the drive only at the roll 18, and by the simple expedient of maintaining an intermeshing relationship between the conveyor belt and a woven wire band on the drive roll.

Referring to Figs. 3 and 4, conveyor belt 15 is of woven wire formation, typically a known type of weave comprising transverse spiral turns 24 interconnected by the reversely curved cross wires 25 so that the belt is capable of longitudinal flexure, or the spiral turns 24 are capable of relative turning or pivotal movement, about the wires 25.

Referring to Fig. 2, the drive roll 18 may have any suitable form capable of carrying the woven wire band. Typically, the roll is shown to comprise a drum 26 having a rotatably driven shaft 27 and carrying on its outer surface a continuous annular band 28 of woven wire mesh corresponding in form and width to the belt 15. The band 28 may be attached to the roll as by welding it to a steel drum 26.

In passing about the band 28, the conveyor belt 15 becomes intermeshed and in effect geared thereto in a manner establishing the transmission of a positive and non-slipping advancing drive from the band to the belt, and confinement of the belt against transverse movement on the drive roll. As illustrated in Fig. 3 the transverse spiral turns 24 of the band and belt are in such vertical overlapping relation that rotation of the band 28 is transmitted against the wire formations of the conveyor to positively advance the latter, while the same overlapping relation positively holds the belt against lateral displacement. This same relationship is further illustrated at the right in Fig. 4 showing the superposed association of the belt with the band 28.

In this connection the invention is particularly concerned with the use and interfitting relation of the particular type of woven wire mesh illustrated, i. e. in which the adjacent flattened spiral wire turns 24 have reverse angularities. That is to say, those portions, e. g. 30 and 31, of the spiral turns at the corresponding side or surface of the belt, extend relatively at reverse angularities. Accordingly, when engaged as shown in Figs. 3 and 4, the belt and band fabrics have V-form intermeshing relationships defined by the interfits and angularities of the spiral turns, and resulting from the engagement and overlying position of each right hand spiral in the belt, with and in relation to the left hand spirals in the underlying band.

We claim:

1. The combination including an endless woven wire conveyor belt, a drive roll about which said belt extends, and woven wire on the surface of said roll and intermeshing with said belt to advance the latter.

2. The combination including an endless woven wire conveyor belt, a drive roll about which said belt extends, and woven wire on the surface of said roll intermeshing with and having the same weave as said belt.

3. The combination including an endless conveyor belt formed of woven wire comprising successive transverse flattened spirals looped and pivoting about interconnecting wires, a drive roll about which the belt extends, and an annular band of woven wire on the surface of said roll having the same weave as the belt and intermeshing therewith to advance the belt while confining it against lateral displacement on the drive roll.

4. The combination including an endless conveyor belt formed of woven wire comprising successive transverse flattened spirals looped and pivoting about interconnecting wires, a drive roll about which the belt extends, and an annular band of woven wire on the surface of said roll having the same weave as the belt and intermeshing with substantially the entire width of the belt to advance the belt while confining it against lateral displacement on the drive roll.

5. The combination including an endless conveyor belt formed of woven wire comprising successive transverse flattened wire spirals looped and pivoting about transverse interconnecting wires, adjacent spirals having opposite angularities, a drive roll about which the belt extends, and an annular band of woven wire on the surface of said roll having the same weave as the belt and intermeshing therewith to advance the belt while confining it against lateral displacement on the drive roll.

LELAND H. PLATT.
LELAND H. PLATT, JR.
JOHN D. PLATT.

REFERENCES CITED

The following references are of record in the file of this patent:

UNITED STATES PATENTS

| Number | Name | Date |
|---|---|---|
| 951,721 | Bowman | Mar. 8, 1910 |
| 1,494,655 | Westerman | May 20, 1924 |
| 1,674,794 | Peiler | June 26, 1928 |
| 1,675,596 | Bradbury | July 3, 1928 |
| 1,764,791 | Ingle | June 17, 1930 |
| 1,769,818 | Anderson | July 1, 1930 |
| 1,840,200 | Hurxthal | Jan. 5, 1932 |
| 1,952,873 | King | Mar. 27, 1934 |